United States Patent Office 3,642,932
Patented Feb. 15, 1972

3,642,932
OLEFIN POLYMERIZATION TO YIELD PREDOMINANTLY DIMERS AND TRIMERS
Burnett H. Johnson, Baytown, Tex., assignor to Esso Research and Engineering Company
No Drawing. Continuation-in-part of application Ser. No. 814,524, Apr. 7, 1969, which is a division of application Ser. No. 594,682. This application Feb. 2, 1970, Ser. No. 8,050
Int. Cl. C07c 3/18
U.S. Cl. 260—683.15 D
13 Claims

ABSTRACT OF THE DISCLOSURE

Dimers and trimers of mono-alhpa-olefins are produced with a Friedel-Craft type catalyst system consisting of a first component selected from a compound having the formula:

$$RMeX_2$$

where:

R is a lower alkyl group, e.g., $C_1$ to $C_6$
X is Cl, Br, or I, and Me is Al, Ga or In;

and the second component is a Group Ib, IIb, or IVb metal halide (the groups as found in the Periodic Table of the Elements) or binary compound of the metal halide with $AlCl_3$, $GaCl_3$, or $InCl_3$.

CROSS-REFERENCE TO RELATED APPLICATIONS

This application is a continuation-in-part of Ser. No. 814,524, filed Apr. 7, 1969, entitled "New Catalysts for the Polymerization of Olefins to Yield Predominantly Dimers and Trimers," now abandoned, which is a division of Ser. No. 594,682, now U.S. 3,475,347.

BACKGROUND OF THE INVENTION (1) Field of the invention

The present invention is directed to a catalyst of the Friedel-Craft type for the polymerization and copolymerization of olefins to produce low molecular weight compounds. More particularly, the invention is directed to a catalyst system consisting of two components which produces primarily dimers, trimers, and tetramers of olefins.

(2) Prior art

U.S. 2,935,542, Minkler et al., May 3, 1960
U.S. 2,993,035, Christman, July 18, 1961
U.S. 3,128,252, Tornqvist, Apr. 7, 1964
U.S. 3,121,063 Tornqvist, Feb. 11, 1964
U.S. 3,001,951, Tornqvist, Aug. 26, 1961
U.S. 2,914,520, Vandenburg, Nov. 24, 1959
U.S. 2,965,691, Voltz, Dec. 20, 1960
U.S. 2,980,744, Voltz, Apr. 18, 1961
U.S. 3,090,821, Voltz, May 21, 1963
U.S. 3,090,822, Voltz, May 21, 1963
U.S. 3,349,148, Bush, Oct. 24, 1967
U.S. 3,431,317, Amir, Mar. 4, 1969
617,652 (Canada), Tornqvist, Apr. 4, 1961

SUMMARY OF THE INVENTION

The present invention may be briefly described as a Friedel-Craft type catalyst system consisting of a first component selected from a compound having the formula:

$$RMeX_2 \text{ or } R_2MeX$$

where:

R is a lower alkyl group, e.g., $C_1$ to $C_6$
X is Cl, Br, or I, and Me is Al, Ga or In;

and the second component is a Group Ib, IIb, or IVb, metal halide (the groups as found in the Periodic Table of the Elements published on the back cover of Chemistry of Organic Compounds, by Carl R. Noller, W. B. Saunders Company, 1951) or binary compound of the metal halide with $AlCl_3$, $GaCl_3$, or $InCl_3$.

While the catalyst system of the present invention has been characterized as of the Friedel-Craft type, the catalyst system of the present invention has higher activities at moderate temperatures and pressures than known Friedel-Craft type catalysts. Further, the catalysts of the present invention are more selective to particular isomers, not necessarily the most stable thermodynamically, than is the case with most Friedel-Craft catalysts. One unusual property of the catalyst system of the present invention is the ability to produce straight chain dimers and trimers which involves reaction other than just the double bond.

DESCRIPTION OF THE PREFERRED EMBODIMENTS

The catalyst of the present invention will polymerize the lower olefins to the dimer, trimer, and tetramer. The lower olefins are illustrated by the $C_2$ to $C_6$ straight and branched chain monoolefins such as ethylene, propylene, butene-1, cis and trans butene-2, isobutene, etc. Also mixtures of the lower olefins may be copolymerized.

The first component of the catalyst system of the present invention may be illustrated by methyl-aluminum dichloride, dimethyl aluminum chloride, ethyl-aluminum dibromide, dibutyl aluminum chloride, diethyl aluminum iodide, methylgallium dichloride, ethylindium dichloride, etc. Preferably the first component is an alkyl aluminum dichloride or dialkyl aluminum chloride; however, the monoalkyl aluminum dihalide is more reactive.

The second component of the catalyst system may be exemplified by CuX, $CuX_2$, AgX, $ZnX_2$, $CdX_2$, HgX, $HgX_2$, $SnX_4$, $SnX_2$, $PbX_2$, $CuMeX_4$, $AgMeX_4$, $ZnMe_2X_8$ and $PbMe_2X_8$ where X is Cl, Br or I and Me is Al, Ga or In. While each of the second component compounds of the catalyst system yields a straight chain dimer, the particular selection would be based on the specific isomers desired. For example in the dimerization of propylene, the catalyst system of the present invention yields with high activity trans-4-methyl-2-pentene in greater abundance than either 2methyl-1-pentene or 2-methyl-2-pentene, both of which are more favored thermodynamically.

The components of the catalyst system of the present system may be combined and used in their pure state or preferably are dispersed in an inert saturated hydrocarbon diluent. Paraffin diluents such as hexane, heptane, octane, isooctane, cyclohexane and the like are suitable. The components are combined so that the mol ratio of the first component to the second component is equal to or greater than one. The mol ratio may be three to one; however, a ratio of one to one is suitable.

The dimerization reaction may be carried out at reaction temperatures of −10° to 30° C., preferably 0° to 25° C. The selectivity to dimers may be improved at the lower temperatures. The pressure of the reaction system in the dimerization of the normally gaseous olefins is between 0.1 to 100 atmospheres. However, room temperature and one atmosphere pressure are suitable. When normally liquid olefins are dimerized, the liquid olefin may be reacted in concentrations as low as 1%, although it is preferred to use higher concentrations, preferably 50% or higher.

The invention will be further illustrated by the following specific examples which are given by way of illustration and not as limitations on the scope of the invention.

EXAMPLE 1

A catalyst comprised of 0.1 gm. of $CuAlCl_4$ plus 0.1 gm. of $(C_2H_5)AlCl_2$ in 5 ml. of isooctane were introduced to a flask with stirrer at 25° C. An atmosphere of propylene was added (760 mm. Hg pressure) and rapid reaction took place. Two grams of propylene was polymerized prior to stopping the reaction. The product contained 95% dimer which was analyzed as shown below.

| | Mol, percent |
|---|---|
| 2-methylpentane | 1.3 |
| 4-methyl-1-pentene | 1.0 |
| Cis-4-methyl-2-pentene | 4.5 |
| Trans-4-methyl-2-pentene | 30.4 |
| 2-methyl-1-pentene | 0.6 |
| 2-methyl-2-pentene | 29.9 |
| Normal-hexenes | 27.4 |

EXAMPLE 2

The conditions were the same as Example 1, except $(C_2H_5)_2AlCl$ was used instead of $(C_2H_5)AlCl_2$. The product contained 97% dimers which analyzed as follows:

| | Mol, percent |
|---|---|
| 4-methyl-1-pentene | 2.7 |
| Cis-4-methyl-2-pentene | 6.7 |
| Trans-4-methyl-2-pentene | 49.0 |
| 2-methyl-1-pentene | 2.7 |
| 2-methyl-2-pentene | 10.8 |
| Normal-hexenes | 28.1 |

EXAMPLE 3

The conditions were the same as Example 1, except CuCl was used instead of $CuAlCl_4$. The product contained greater than 90% dimers which were analyzed as given below:

| | Mol, percent |
|---|---|
| 4-methyl-1-pentene | 1.5 |
| Cis-4-methyl-2-pentene | 5.7 |
| Trans-4-methyl-2-pentene | 33.5 |
| 2-methyl-1-pentene | 2.9 |
| 2-methyl-2-pentene | 24.1 |
| Normal-hexenes | 32.3 |

EXAMPLE 4

The conditions were the same as Example 1, except $AgAlCl_4$ was used instead of $CuAlCl_4$. The analysis of the dimer fraction which was 94% of the product is given below:

| | Mol, percent |
|---|---|
| 4-methyl-1-pentene | 1.4 |
| Cis-4-methyl-2-pentene | 5.7 |
| Trans-4-methyl-2-pentene | 39.8 |
| 2-methyl-1-pentene | 1.9 |
| 2-methyl-2-pentene | 29.2 |
| Normal-hexenes | 22.0 |

EXAMPLE 5

The conditions were the same as Example 1, except $ZnAl_2Cl_8$ was used instead of $CuAlCl_4$. The analysis of the dimer fraction which was 80% of the product is given below:

| | Mol, percent |
|---|---|
| 4-methyl-1-pentene | 1.9 |
| Cis-4-methyl-2-pentene | 11.2 |
| Trans-4-methyl-2-pentene | 60.8 |
| 2-methyl-1-pentene | 0.0 |
| 2-methyl-2-pentene | 0.0 |
| Normal-hexenes | 26.1 |

EXAMPLE 6

The conditions were the same as in Example 1, except $PbAl_2Cl_8$ was used instead of $CuAlCl_4$. The product which was 100% dimer, analyzed as follows:

| | Mol, percent |
|---|---|
| 4-methyl-1-pentene | 15.5 |
| Cis-4-methyl-2-pentene | 7.3 |
| Trans-4-methyl-2-pentene | 26.7 |
| 2-methyl-1-pentene | 2.5 |
| 2-methyl-2-pentene | 2.5 |
| Normal-hexenes | 45.5 |

EXAMPLE 7

A catalyst comprising 0.1 gm. of CuCl plus 0.12 gm. of $(C_2H_5)AlCl_2$ in 5 ml. of isooctane were introduced into a flask with stirrer at 25° C. An atmosphere of a 50—50 mol percent mixture of propylene and ethylene was added (760 mm. of Hg) and reaction took place. The product was analyzed and found to be approximately 29.6% $C_4$, 57.9% $C_5$, and 12.5% $C_6$ with small amounts of $C_8$. The $C_5$ fraction was predominantly cis and trans pentene-2.

By the foregoing example, the predominance of $C_5$ illustrates the copolymerization which will occur with mixtures of lower olefins.

EXAMPLE 8

A catalyst comprising 0.1 gm. of $AgAlCl_4$ plus 0.12 gm. of $(C_2H_5)AlCl_2$ in 5 ml. of isooctane were introduced into a flask at 25° C. and stirred. An atmosphere of ethylene was added and a rapid reaction occurred. The product was analyzed and found to be 77% $C_4$, 21% $C_6$, and 2% $C_8$.

The nature and objects of the present invention having been fully described and illustrated, what I wish to claim as new and useful and secure by Letters Patent is:

1. In the polymerization of olefins to yield predominantly dimers and trimers, the improvement which comprises:
    polymerizing $C_2$ to $C_6$ monoolefins at a temperature between about −10° to 30° C. with a catalyst which consists of a first component selected from the group consisting of $(C_2H_5)AlCl_2$ and $(C_2H_5)_2AlCl$; and a second component selected from the group consisting of $CuAlCl_4$, CuCl, $AgAlCl_4$, $ZnAl_2Cl_8$ and $PbAl_2Cl_8$; said first component and said second component being combined such that the mol ratio is between 1:1 and 3:1.

2. A process according to claim 1 wherein the first component is $(C_2H_5)AlCl_2$.

3. A process according to claim 1 wherein said second component is $CuAlCl_4$.

4. A process according to claim 1 wherein said second component is CuCl.

5. A process according to claim 1 wherein said second component is $AgAlCl_4$.

6. A process according to claim 1 wherein said second component is $ZnAl_2Cl_8$.

7. A process according to claim 1 wherein said second component is $PbAl_2Cl_8$.

8. A process according to claim 3 wherein said monoolefin is propylene.

9. A process according to claim 4 wherein said monoolefin is propylene.

10. A process according to claim 5 wherein said monoolefin is propylene.

11. A process according to claim 6 wherein said monoolefin is propylene.

12. A process according to claim 7 wherein said monoolefin is propylene.

13. A process according to claim 1 wherein the first component is $(C_2H_5)_2AlCl$.

References Cited

UNITED STATES PATENTS

| | | | |
|---|---|---|---|
| 2,935,542 | 5/1960 | Minckler et al. | 260—683.15 |
| 2,965,691 | 12/1960 | Voltz | 260—683.15 |
| 3,090,821 | 5/1963 | Voltz | 260—683.15 |
| 3,090,822 | 5/1963 | Voltz | 260—683.15 |

PAUL M. COUGHLAN, JR., Primary Examiner